United States Patent [19]

Sze

[11] 4,346,474
[45] Aug. 24, 1982

[54] EVEN-ODD PARITY CHECKING FOR SYNCHRONOUS DATA TRANSMISSION

[75] Inventor: Daniel T. W. Sze, Boca Raton, Fla.

[73] Assignee: International Business Machines Corporation, Armonk, N.Y.

[21] Appl. No.: 165,581

[22] Filed: Jul. 3, 1980

[51] Int. Cl.³ .............................................. G06F 11/10
[52] U.S. Cl. ..................................... 371/49; 364/200; 371/50
[58] Field of Search ............................ 371/49, 50, 51; 364/200, 900

[56] References Cited

U.S. PATENT DOCUMENTS

| 3,212,063 | 10/1965 | Olson | 371/49 |
|---|---|---|---|
| 3,404,372 | 10/1968 | Robbins | 371/49 |
| 3,456,239 | 7/1969 | Glasson | 371/47 |
| 3,519,988 | 7/1970 | Grossman | 371/50 |
| 3,696,153 | 9/1972 | Rosenfeld | 371/49 |
| 3,831,144 | 8/1974 | En | 371/50 |
| 3,887,901 | 6/1975 | Moore | 371/51 |
| 3,889,236 | 6/1975 | Herger et al. | 364/200 |
| 3,992,696 | 11/1976 | Fergeson | 371/51 |
| 4,005,405 | 1/1977 | West | 371/38 |
| 4,093,981 | 6/1978 | McAllister et al. | 364/200 |
| 4,271,521 | 6/1981 | Mahmood | 371/51 |

FOREIGN PATENT DOCUMENTS 1187780 4/1970 United Kingdom .

Primary Examiner—Charles E. Atkinson
Attorney, Agent, or Firm—D. Kendall Cooper; John C. Black; J. Jancin, Jr.

[57] ABSTRACT

A synchronous data transmission system between remote stations is shown wherein data is transmitted parallel by bit serial by group over a plurality of parallel lines extending between sending and receiving stations. A parity line is also included in the transmission system for checking errors and a clock line is included for synchronization of the parallel data being transmitted. Information is transmitted from one station to another with alternating even and odd parity for succeeding groups of parallel data. The information is checked at the receiving station for even-even or odd-odd parity in succeeding groups of data. Longitudinal redundancy checking (LRC) is also added to the checking at a receiving station. The combination of the even and odd parity checking and the LRC checking provides a level of data transmission error checking which is almost as effective in finding errors as a far more costly CRC checking mechanism. The checking arrangement is adaptable to serial-by-bit transmission systems, as well.

7 Claims, 10 Drawing Figures

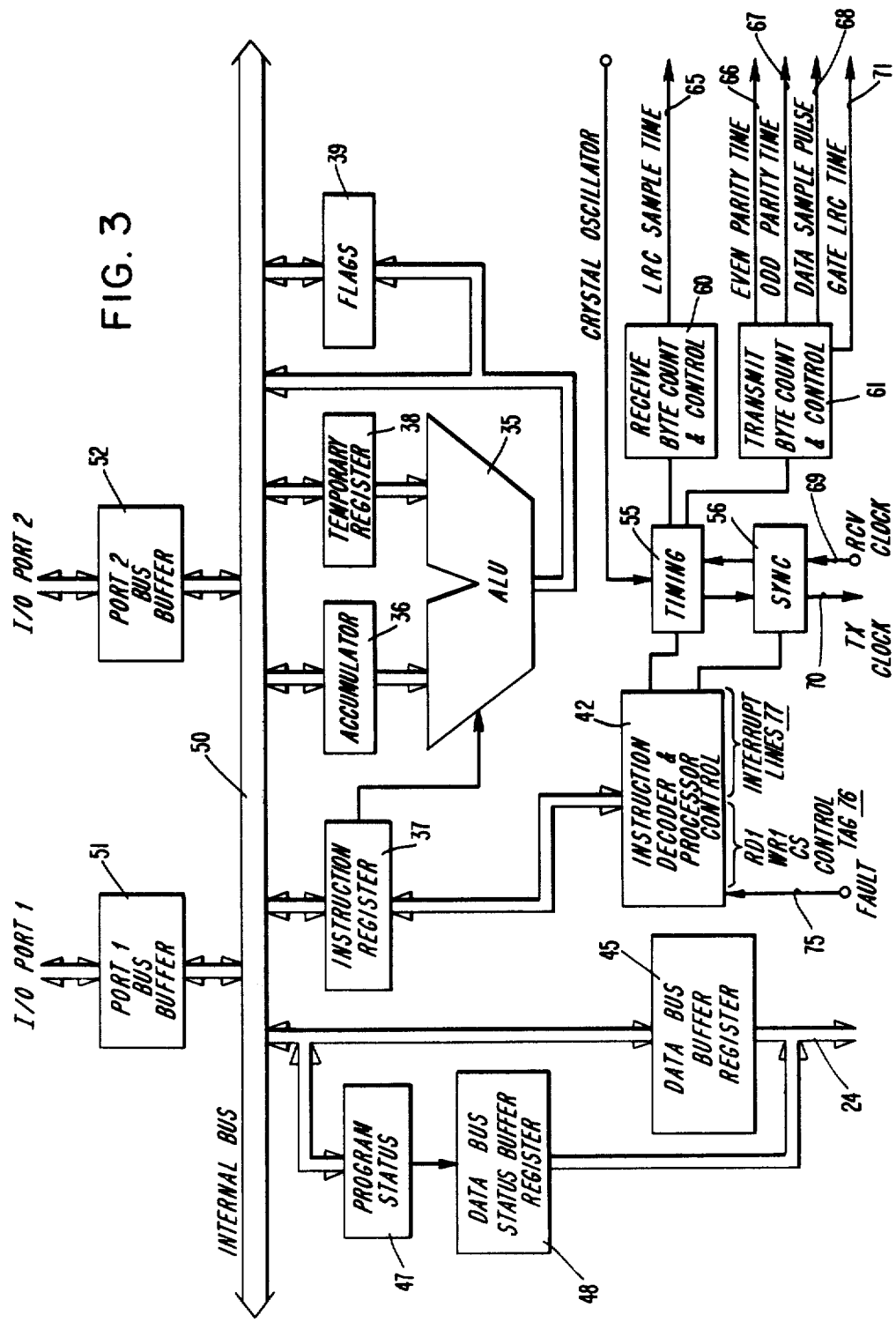

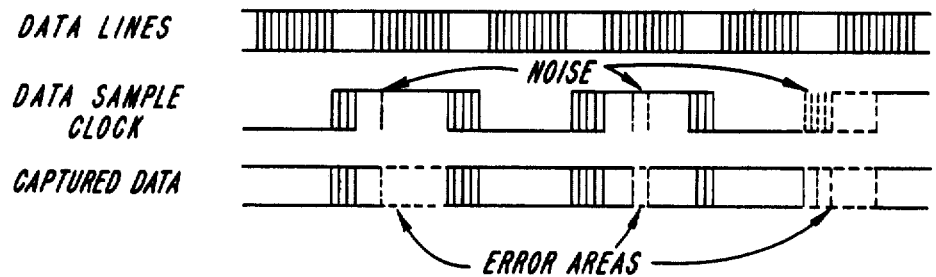

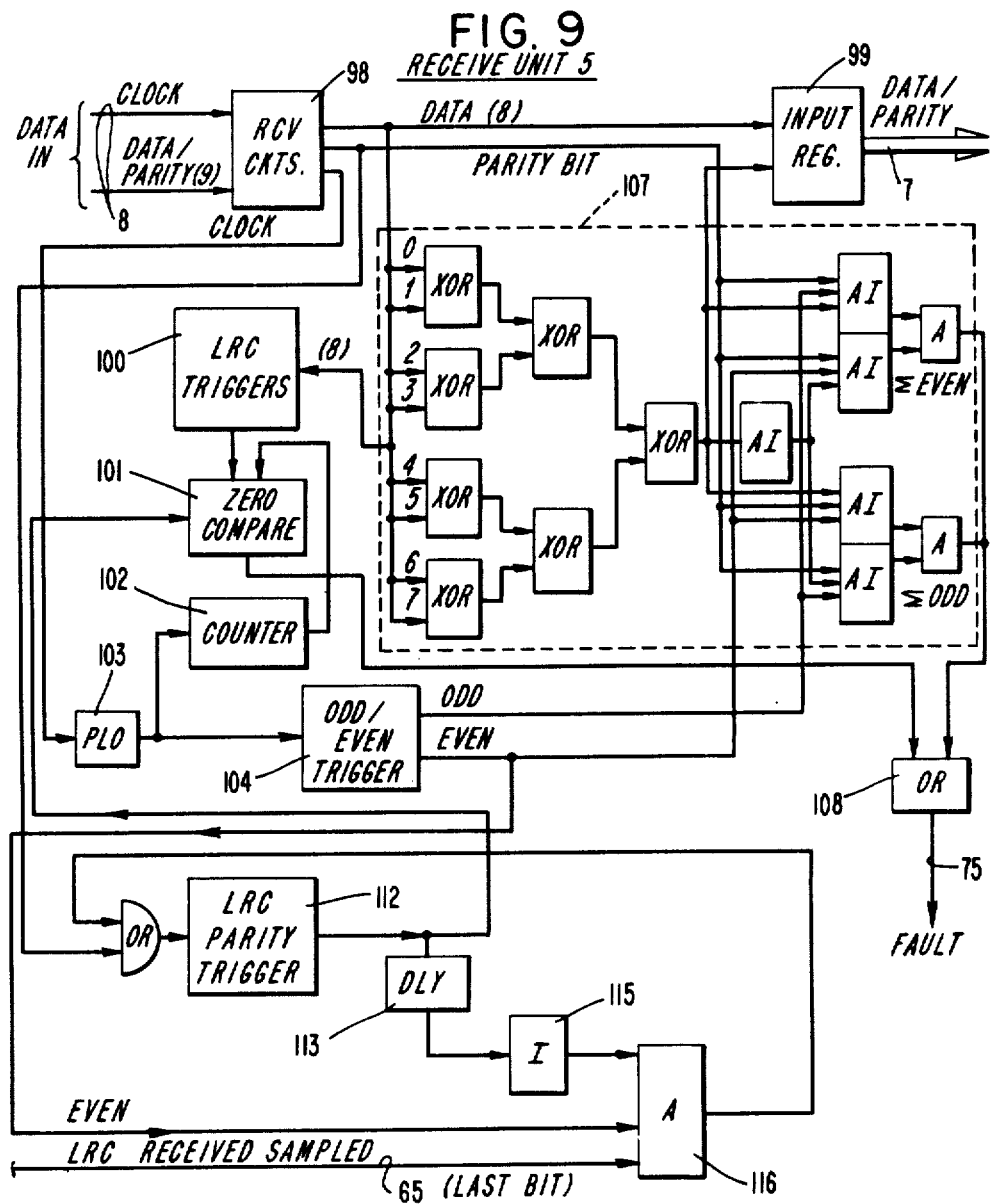

EVEN-ODD PARITY CHECKING FOR SYNCHRONOUS DATA TRANSMISSION

BACKGROUND OF THE INVENTION

The present invention relates to an improved method and means for error checking in data transmission systems of the type wherein data bit groups are transmitted serial by group over a plurality of parallel lines between sending and receiving stations, but is also applicable to systems utilizing serial-by-bit transmission. In data transmission systems of the parallel type, it is known in the art to make use of parity bits transmitted simultaneously with the data bit groups to determine the presence of errors which can occur in the transmission. In most instances, the prior art teaches the use of either even parity checking or odd parity checking of the data. In some instances, even parity checking is used for one complete record of data bit groups and odd parity checking is used for the next succeeding record of data bit groups.

Another means for checking for transmission errors in transmission systems of this type is referred to as longitudinal redundancy checking (LRC) wherein a predetermined number of data bit groups are transmitted followed by a longitudinal redundancy check bit group. This LRC check bit group is obtained for each bit position in the data bit group by counting the number of bits transmitted between each LRC bit group and determining the even or odd number of bits counted. Then a logical one or zero bit is assigned to the LRC bit group, depending upon whether even or odd checking is selected for use. At the receiving station, the data bit groups followed by the LRC group are fed into an LRC checking circuit to determine whether or not errors have occurred. Parity error checking and LRC checking and the combination of both are frequently used in data transmission systems to determine the existence of a large number of potential errors that can be created.

In the prior art, if a higher degree of error checking is desired, it is common to use a cyclic redundancy checking (CRC) algorithm to find a very high percentage of the possible errors which can occur.

The cost of the apparatus at the transmitting and receiving stations for CRC checking is very expensive in relation to the cost of both parity checking circuitry and LRC checking circuitry. Hence, in most situations, CRC checking is not used in parallel data transmission systems.

It has been found that by using apparatus which combines the conventional parity checking circuits and the LRC circuits in a distinctive way a very high percentage of the possible errors can be detected, substantially approaching the checking ability of the CRC implementation by merely assigning odd and even parity to succeeding groups of bits that are transmitted.

It is therefore an object of the present invention to provide an improved error checking mechanism for parallel data transmission systems which is low in cost but which approaches the error checking capabilities of CRC checking mechanisms and that can be used with serial data transmission systems, as well.

As stated, the principles of the present invention can be utilized in conjunction with data transmission systems wherein data is transmitted in a serial-by-bit fashion rather than in parallel. However, the cost advantages of the present system in comparison with the cost of the CRC checking mechanisms may not be as great as that encountered in a parallel transmission system. There may be some circumstances such as in a system that accommodates both parallel and serial transmission for utilizing the even-odd parity checking scheme described herein in conjunction with commonly shared logic and then similar cost advantages should accrue.

SUMMARY OF THE INVENTION

In accordance with a preferred embodiment of the present invention, each station in a synchronous data transmission system is provided with an improved method and means for detecting errors in transmission. The transmit unit includes an even and odd parity generating circuit which applies parity bits to data groups being transmitted from the station such that one group has odd parity assigned to it, the next group has even parity assigned to it, the next succeeding group has odd parity and so on. Data to be transmitted is also entered into an LRC trigger circuit to form LRC bit groups which are transmitted after each of a predetermined number of data bit groups. At a receiving station, the data bit groups are checked for succeeding even-odd parity and the data bit groups and their respective LRC bit groups are checked by a corresponding LRC checking circuit. Signals are produced by the checking circuits in the event that a parity or LRC error is detected.

The individual stations are arranged in a ring system with control of transmission and receipt of data being provided by a controller unit that can be a microprocessor or similar controlling device.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

FIG. 3 is a block or data/control signal diagram for the microprocessor controller device.

FIG. 4 illustrates possible error conditions that may occur in a system of this nature due primarily to clocking errors, for example.

FIG. 5 shows a series of data frames in a byte format with the even-odd parity correctly shown.

FIG. 6 is a further expansion of FIG. 5 showing the present frame and the frame before and the frame after it with the proper LRC in the correct locations.

FIG. 9 illustrates detailed circuitry at the receiving unit for utilizing the data and even-odd parity information.

FIG. 10 is a truth table for the even-odd parity checking portion of the circuitry shown in FIG. 9.

DESCRIPTION OF THE PREFERRED EMBODIMENT

Figure 1:
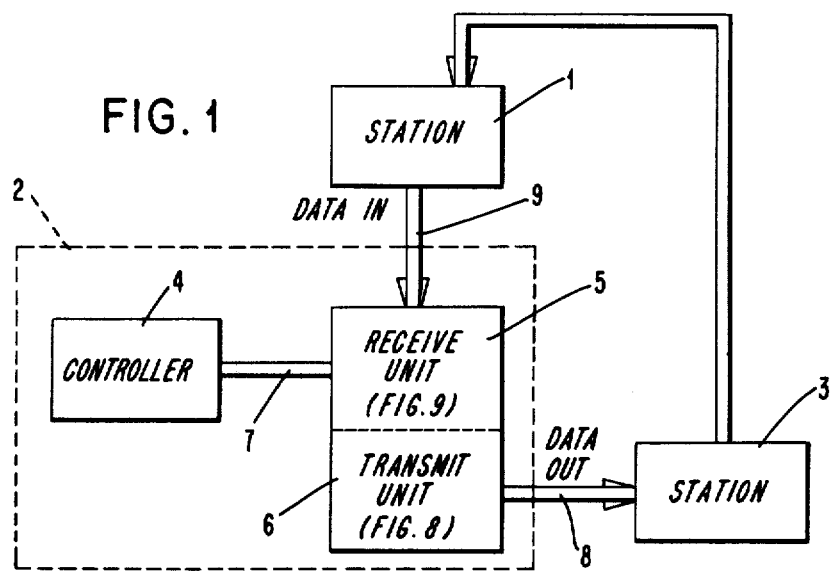
FIG. 1 diagrammatically illustrates a representative system within which the present invention may be used, the system comprising three stations and each station typically having a controller device.
Figure 8:
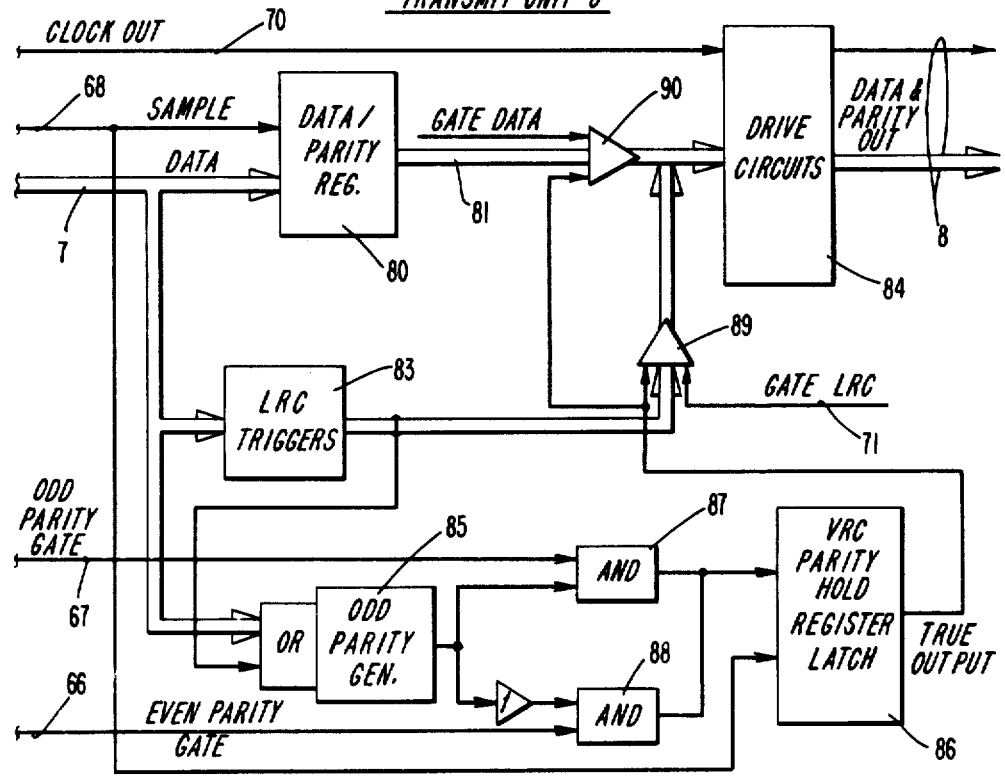
FIG. 8 illustrates the detailed transmission circuits utilized for accomplishing the transmission of data and proper parity configurations in accordance with the present invention.

FIG. 1 illustrates a representative communications system within which the present inventive improvement may be used. Thus, in FIG. 1 three data receiving and transmitting stations 1, 2 and 3 are shown coupled to each other in a loop. Station 1 can transmit data to station 2. Station 2 can transmit data to station 3 and station 3 can transmit data back to station 1. By suitable means which are not associated with the present improvement, station 1 can transmit data to station 3 by means of bypass circuits (not shown) of construction well known in the art. For purposes of the present invention, the data transmit unit associated with any one of the stations comprises as a part thereof the required circuits for generating both even and odd parity for data and an LRC character to follow each predetermined number of data groups, as illustrated in FIG. 8. The data receiving unit in each station incorporates circuitry illustrated in FIG. 9. This unit includes the required odd-even parity checking circuits and the LRC checking circuits.

Other items of interest in FIG. 1 include the main bus 7 from controller 4 to the receive unit 5 and transmit unit 6, the data out bus 8 from the transmit unit 6 to station 3 and the receive bus 9 from station 1 to receive unit 5.

Controller

Figure 2:
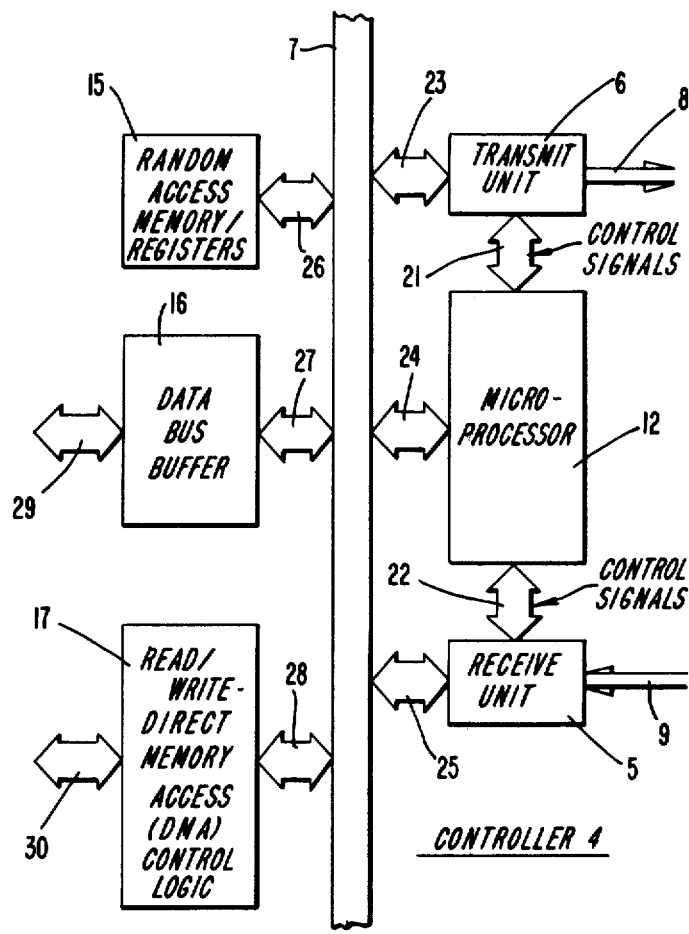
FIG. 2 illustrates one of the stations shown in FIG. 1 in more detail, the station utilizing a microprocessor controller, as an example.

FIG. 2 illustrates details of the controller 4 of FIG. 1, and its relationship to receive unit 5 and transmit unit 6. This includes various elements concerned with the transmission and receipt of information in the system, as well as development and recognition of control signals. Controller 4 has a microprocessor 12 that is primarily responsible for monitoring and analyzing the information transmitted in the system as well as developing the specific control signals. The microprocessor is illustrated in greater detail in FIG. 3 and will be discussed shortly. Other items in FIG. 2 include transmit unit 6 which operates to transmit information by way of the data out bus 8, also shown in FIG. 1. The receive unit 5 receives information over bus 9 from station 1 which in turn is provided to the microprocessor 12. Controller 4 also includes the data bus 7 which serves as a common bus for transmittal of commands and data in the controller. Interconnected to the data bus 7 is a random access memory/registers block 15, a data bus buffer block 16 and read/write-direct memory access (DMA) control logic 17. The various elements associated with controller 4 are interconnected by dropping buses via the data bus 7, the dropping buses being designated 23-30.

The purpose of random access memory/registers block 15 is to provide temporary buffer storing of control information as well as serving as a buffer for data. The data bus buffer 16 serves as a connection to the host processor temporarily buffering data going into the host processor. Block 17 provides the control logic and the setup by the host processor so that the controller can access the host processor memory and provides the DMA function going in and out of the host processor. It is also the vehicle by means of which the host processor can tell the controller where it should be reading or writing information in and out of the host processor. Microprocessor 12 provides the centralized control required for the transmittal and receipt of information into and out of the station and basically provides controls for all station functions. Transmit unit 6 provides a vehicle for transmitting data via the data out bus 18. Receive unit 5 provides the input to the station. That is, it picks up the data from the data in bus 9 and deciphers the data as well as the clock for the input to the microprocessor.

Microprocessor

FIG. 3 illustrates the microprocessor 12 of FIG. 2 in greater detail. The microprocessor includes an arithmetic logic unit (ALU) 35 having an associated accumulator 36 and several registers including an instruction register 37, a temporary register 38 and a flags register 39. Transmittal of information and commands internally within the microprocessor is by way of an internal bus 50. Instructions in the instruction register 37 are decoded for development of necessary operations by a decode and processor control block 42. Timing in the microprocessor is provided by block 55 operating in conjunction with a synchronizing (Sync) block 56. Transmit byte, count and control functions are provided by block 61 having various outputs on lines 66-68 and 71. Received byte count and control functions are provided by block 60 which provides a longitudinal redundancy check (LRC) sample time signal on line 65.

Also interconnected with internal bus 50 is a data bus buffer register 45 that is interconnected by way of dropping bus 24 (also shown in FIG. 2) to the microprocessor data bus 7. Associated with that particular register are a program status block 47 and a data bus status buffer register 48.

Other devices may be attached to microprocessor 12 by way of internal bus 50 through ports designated input/output (I/O) port 1 and I/O port 2 each having a respectively associated bus buffer 51 and 52.

The primary blocks of interest here are blocks 42, 55, 56, 60 and 61. Block 60 contains a set of count circuits that count the number of data bytes that are received. The count is controlled with inputs from the circuits of timing block 55 and it provides an output on sample time line 65. Block 61 also consists of a set of count circuits and controls required to properly time the even parity and odd parity signals. It also provides the data sample pulse for the transmit unit of FIG. 8 to sample its data. The transmit unit of FIG. 8 also receives from Sync block 56, line 70, the transmit clock. The receive unit of FIG. 9 deciphers the input data coming in and provides the Sync block 56 with the receive clock. The Sync block 56 will use the receive clock and synchronize with the internal timings of the microprocessor providing the clocking signals to blocks 60 and 61. These timings are also synchronized with the internal processor functions when the processor detects fault timing signals provided from FIG. 9, line 75.

Bus 76 is a set of lines that provides signals to determine whether the transmit unit and receive unit should be reading (RD1) or writing (WR1). It also provides cycle steal (CS) signals for memory accessing and control tag, signals indicative of the status of the receive unit and transmit unit. The interrupt lines 77 are lines from the receive unit of FIG. 9 that indicate whether the receive lines coming in are active or not. It also provides the internal signal to the main host processor interrupting the host processor to advise it that there is data intended for the host processor.

The host processor provides control information to the microprocessor by way of bus 76 to indicate whether it should be in a reading or writing status. Other control information sent to the microprocessor causes it to scan its internal registers.

Data and Clock Relationships and Error Conditions

FIG. 4 shows data and clock timing relationships and error conditions.

There are two types of noise errors that can happen in a system that are not easily detectable, especially with single parity and LRC check.

The first type of error concerns noise manifested as additional clocks. This appearance can cause the same data byte to be sampled twice or even three times. If it is sampled three times, especially, there will be an appearance of a double error in the LRC direction which implies that it might go unnoticed.

The second type of error is caused by noise in the reverse direction thereby suppressing a complete clock cycle. What it implies is the possibility that previously the data byte may remain in the sample register for a period of two or more clock times. Since the previous data byte has correct parity, it may remain in the register with correct parity causing double error in the LRC direction thereby going undetected again. This is especially true when the register is used as the synchronizing interface between received clock sample source and the hardware internal clocks.

Error Checking in Present System

Figure 7:
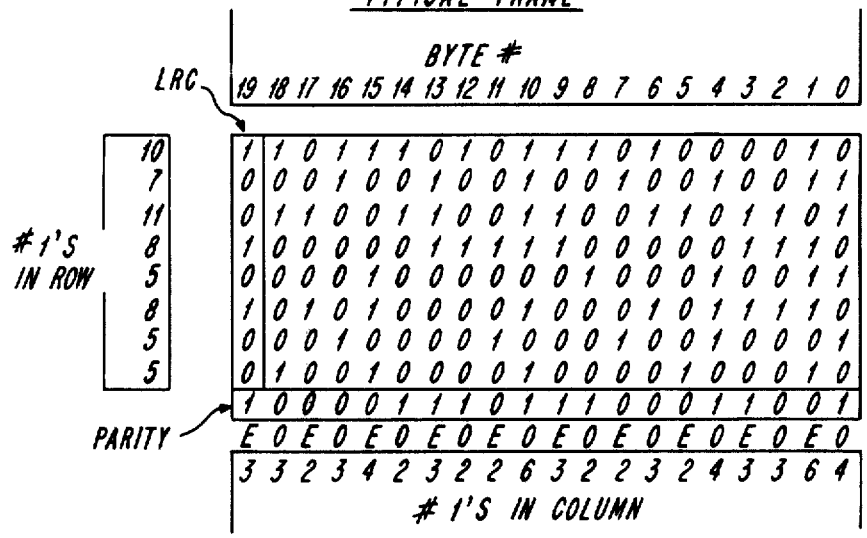
FIG. 7 is an example of the even-odd checking scheme with actual data bits being shown and the even-odd parity bits are also shown in their correct sequences.

FIGS. 5, 6 and 7 illustrate the handling of information in the present system in order to alleviate or minimize the error probabilities that were discussed in conjunction with FIG. 4.

The information is transmitted with even and odd parity checking alternated as illustrated in FIG. 5. Information transmitted with this coding may be checked at the receive station for even-even or odd-odd violations.

The scheme supplements the usage of LRC checking with little or no increase in hardware cost while still providing the level of data transmission checking equivalent to the CRC algorithm. The implementation and product cost is substantially lower than the CRC algorithm. The invention is applicable to any form of serial data synchronous transmission.

FIG. 6 shows typical frames utilizing even-odd parity checking.

Error checking is performed in horizontal and vertical directions via longitudinal redundancy check (LRC) code and parity code respectively. For little additional circuitry, namely, one toggle flip-flop, the parity generator-checker may be made to generate or check alternating even-odd parity. An even-odd parity checker uses exactly the same circuit to generate even-odd parity for comparison with incoming parity. The advantage of the even-odd algorithm over straight even or odd algorithms is the even-odd method costs little or no more and also checks against erroneous "stuck gate" type transmissions in which data and parity lines are unchanging, and parity is correct for the data presented.

Identical LRC circuits may be used for LRC generating and checking as well. Each bit from the LRC generator or checker is as shown in FIG. 7, which is an actual example of a typical frame. In addition, the LRC checker output is exclusive OR'ed with incoming information bit for bit. During byte time 19, all EOR outputs should equal zero if no errors arose during transmission.

Parity and LRC codes are shown where indicated. LRC is horizontal odd parity. Vertical parity alternates odd-even-odd-even as illustrated. Also noted are the number of ones that are in any row or column.

For example, for row 4 (fourth from top), there are eight (8) ones. Since LRC code is odd parity, a one must appear in that position of the LRC.

In byte number 3 (fourth column from right) even parity is to be sent. The number of ones in that byte is three (3) so to generate even parity, a one must be added.

Generation of Parity During Transmission of Data

FIG. 8 illustrates the detailed circuitry for the transmit unit 6 that was previously discussed in conjunction with FIGS. 1 and 2.

FIG. 8 basically generates both the LRC and odd-even parity that goes out into the data line. Signal line 7 from the data bus is sampled by line 68 into the data parity register 80. As the data is sampled, the data is always also accumulated in the LRC triggers 83. At the same time, odd parity is being checked and generated for the data depending on the odd and even parity of the data and on the specific time in which data should be put out which is determined by signals on gate lines 66 and 67. These lines are even parity time and odd parity time lines. If the time going out is odd, it will, therefore, be the odd signal. If the time going out is even, the even signal line will prevail.

Block 85 is the generator and accumulator for the parity circuit. It provides the parity generation circuit for each of the data bytes that are being sent out. It accumulates the data byte in terms of odd or even parity depending on what the specific byte count is for that data byte. If it falls on an odd byte count, it is simply gated out by the odd parity line 67 and block 87 into parity hold register latch 86. However, if it falls on the even time, the odd parity signal is inverted and it is gated out by even parity line 66 through block 88 to parity hold register latch 86. Parity hold register latch 86 serves as a buffer register or holding register so that the complete parity can be gated out as a timing signal. Parity hold register latch 86 in turn gates into gates 89 and 90. Gate 89 serves as a combined gate that determines the time for the LRC parity to be gated out as well as the parity bits to be gated out.

When it comes time for sending out the LRC parity, it will be generated by the LRC line 71 and LRC will go out with the correct parity onto the data bus as well. The circuitry in block 84 provides the drive circuitry for the data bus.

Parity Checking During Receipt of Data

FIG. 9 shows the details of the circuitry for the receive unit 5 previously discussed in conjunction with FIGS. 1 and 2. This circuitry includes a parity checking circuit that is arranged in accordance with the truth table of FIG. 10. The data lines are being received from an external source by receive circuit block 98. The receive circuit block includes amplifier circuits. The amplifier circuits also receive the clock signals. The clock lines go from block 98 into a Phase Locked Oscillator (PLO) block 103 for synchronization with an internal crystal oscillator. The Phase Locked oscillator output in turn goes through a set of counters that count data bytes that come in. It also provides a clock signal that clocks in the receive data to the rest of the circuitry. The data that comes in gets checked by a set of parity check circuits in block 107. Block 107 looks at each of the parity bits coming in, checks the data line that comes in and checks for proper parity. Concurrently, LRC triggers 100 accumulate the LRC check. The parity circuit 107 has a single output line that supplies an odd-even total figure. The odd-even trigger 104 determines when it is even or odd time. The even-odd time is the even-odd time of the data bytes that come in. The received parity also goes to an LRC parity trigger 112. This trigger accumulates odd-even parity bits for the LRC byte. If the LRC sample time or the time to sample the LRC is even, a signal goes to block 116 which provides an extra toggle pulse for the LRC parity trigger. The LRC parity trigger output now serves as the input to the Zero Compare Time block 101 which is used to check the final LRC. The final LRC accumulation at the LRC time should be all zero. If it is not zero, it is a fault condition which is inputted to the OR block 108 to provide a signal on fault line 75.

Block 113 along with block 115 simply provides a delay line sample pulse for gating the signals that toggle the parity trigger 112. It is used specifically to assure the generation of a single pulse signal for the binary trigger. This avoids additional circuits that otherwise might be required for the sample pulse to minimize instability.

FIG. 10 is a truth table representing the organization of the parity checking circuit 107 in FIG. 9. In the first column of the truth table is a summation of all the signals that come in. If the number of the logical data bit ones is an even number and it falls at even time, then the parity to be generated should be even. However, if the number of data bits is odd and it falls in even time, then an odd bit is generated or detected. On the other hand, if the inputs are all even and it falls in odd time, then there should be an odd parity being detected; similarly, if it is an odd number of bits that are being detected and it falls in odd time, then the parity bit should be even that comes in and should be detected as even.

While a preferred embodiment of the invention has been illustrated and described, it is to be understood that there is no intention to limit the invention to the precise constructions herein disclosed and the right is reserved to all changes and modifications coming within the scope of the invention as defined in the appended claims.

I claim:

1. A synchronous transmission system for transmitting, receiving, and checking data bit groups arranged in succeeding frames, each frame typically consisting of a multiplicity of data bit groups, comprising:

a transmission line;

a plurality of stations selectively interconnected for data communications via said transmission line;

a controller at each of said stations, each of said controllers controlling data storage, data transfer, data transmit, data receive, and data checking operations at its respective station, and each of said controllers including a random access memory/register block serving as a buffer storage for control information and data, a data bus buffer serving as a buffer storage for data transferred to and from an external source, control logic for controlling storage accessing and read/write operations of its respective station, and a data bus in said controller interconnecting said memory/register block, said data bus buffer and said control logic;

a controller microprocessor incorporated in each of said controllers for monitoring and analyzing information transmitted and received at its respective station and for developing and recognizing control signals, each of said controller microprocessors including an internal bus for transmittal of information and commands internally within said microprocessor, an arithmetic logic unit having an associated accumulator and a plurality of registers including an instruction register for storing instructions, a decode and control block for developing operations signals from instructions in said instruction register, a transmit block for processing byte, count and control functions during transmission of data and for providing even and odd parity signals and a gate LRC signal, a receive block for processing byte count and control functions during receipt of data, said receive block also providing a longitudinal redundancy check (LRC) sample signal;

a data transmit unit incorporated in each of said controllers, each of said data transmit units being interconnected with the related microprocessor of its respective controller for transmitting data responsive to control signals from the said related microprocessor, each of said data transmit units including a data/parity register for temporarily storing said data bit groups, an even-odd parity circuit for generating even and odd vertical redundancy parity check (VRC) bits for the data bit groups stored in said data/parity register under control of said even and odd parity signals from the said related microprocessor, a longitudinal redundancy check (LRC) circuit for generating longitudinal redundancy check bits for all bit positions of individual frames of data bit groups under control of said gate LRC signal from the said related microprocessor, and each of said data transmit units further including drive circits to supply output signals to said transmission line representative of said data bit groups, even-odd parity check bits and LRC bits during transmission of data; and a data receive unit incorporated in each of said controllers, each of said data receive units being interconnected with the related microprocessor of its respective controller for receiving and checking data from any of said transmit units on a selective basis responsive to control signals from the said related microprocessor, each of said data receive units including receive circuits for receiving signals from said transmission line representative of said data bit groups, said even-odd parity check bits and said LRC bits, a parity check circuit for analyzing data bit groups and even-odd check bits for correct even or odd parity during receipt of data under control of signals from the related microprocessor, an LRC checking circuit for analyzing the LRC characteristics of data in successive frames and comparing the LRC bits developed during receipt of data with the transmitted LRC bits to determine correctness of the LRC of the data bit groups under control of said LRC sample signal from the said related microprocessor, fault indicating circuitry for signaling incorrect even-odd parity and incorrect LRC of received data and each of said data receive units further including an input register for temporarily storing data bit groups as they are received for transfer to other portions of the respective station.

2. The apparatus of claim 1, further comprising:
a plurality of stations in said system arranged in a ring configuration.

3. The apparatus of claim 1, wherein each of said controllers further comprises:
direct memory access control logic circuitry for accessing said main memory; and
means interconnecting each of said controller microprocessors with its respective controller direct memory access control logic circuitry for accessing of said main memory as required during system operation.

4. The apparatus of claim 1, further comprising:
a host processor interconnected with the data bus buffers of each of said controllers for communication with and control of each of said controllers, said host processor including a main memory.

5. The apparatus of claim 4, wherein each of said controller microprocessors further comprises:
timing and synchronizing circuitry for timing and synchronizing data transmit and receive operations;
control circuitry in each of said controller microprocessors for processing read/write signals received from said host processor to determine if the transmit units and receive units in said controllers should be reading or writing information, cycle steal signals for memory accessing, and control tag signals indicative of the status of the transmit units and receive units at said controllers, and
interrupt circuitry in each of said controller microprocessors for indicating when the respective receive unit is active and for advising said host processor.

6. The apparatus of claim 1 further comprising in each controller receive gating means responsive to control signals from the said respective microprocessor for gating data, even-odd parity, LRC and fault indicating circuitry of the said respective data receive unit and operable to gate data and parity signals in said respective data receive unit from said input register to an external utilization device.

7. The apparatus of claim 6 further comprising in each controller transmit gating means responsive to control signals from the said respective microprocessor for gating data, even-odd parity and LRC circuits of the said respective data transmit unit and operable to gate data and parity information to said data/parity register from an external source and wherein said transmit gating means is operable to gate data and parity information from said data parity register to said transmission line.

* * * * *